H. T. WALDNER.
DRIP CUP FOR FOOD CUTTERS.
APPLICATION FILED JUNE 22, 1922.
1,426,025. Patented Aug. 15, 1922.
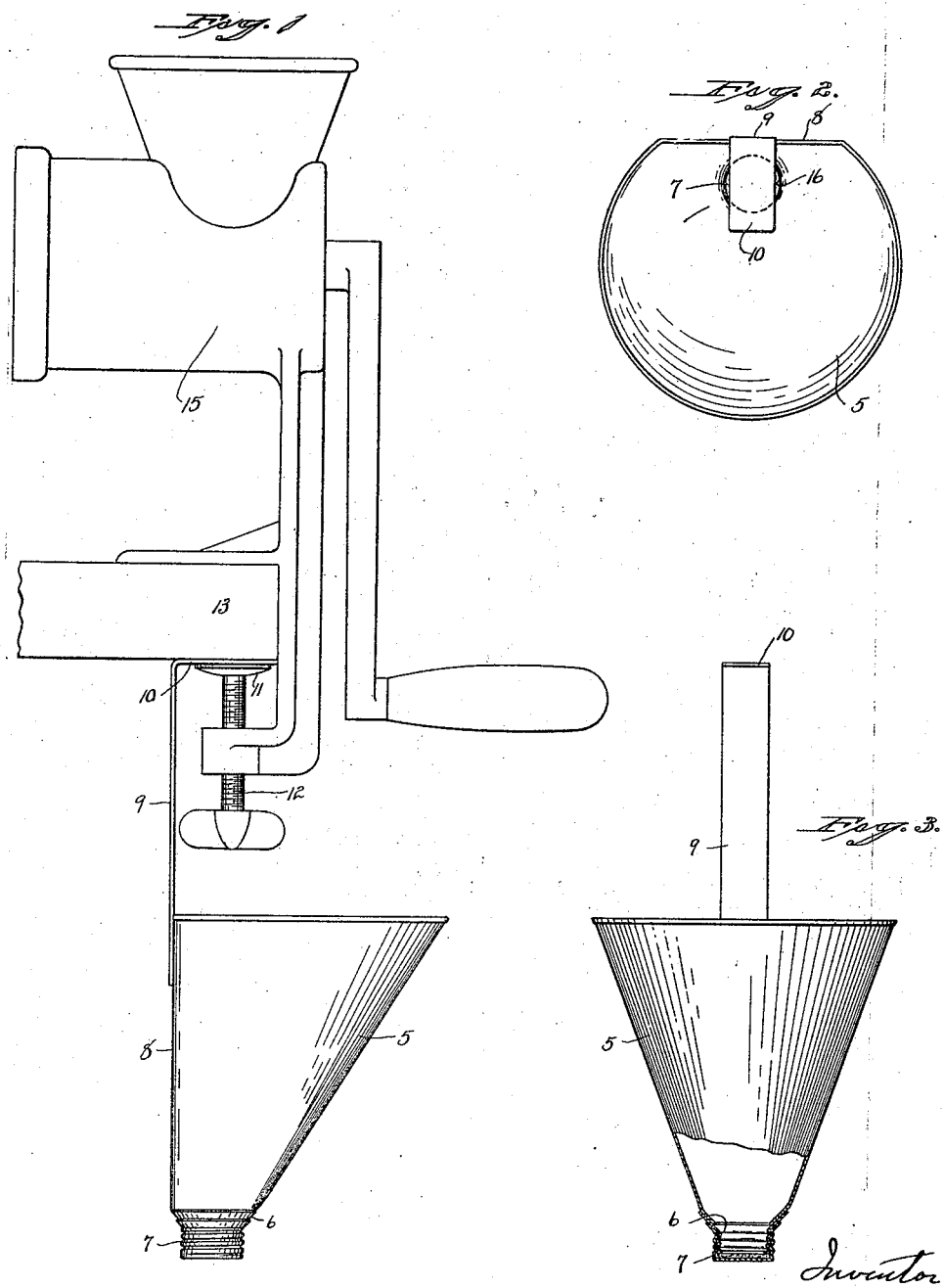

UNITED STATES PATENT OFFICE.

HELMA T. WALDNER, OF MIDDLETOWN, CONNECTICUT.

DRIP-CUP FOR FOOD CUTTERS.

1,426,025.  Specification of Letters Patent.  Patented Aug. 15, 1922.

Application filed June 22, 1922. Serial No. 570,065.

*To all whom it may concern:*

Be it known that I, HELMA T. WALDNER, a citizen of the United States, residing at Middletown, in the county of Middlesex and State of Connecticut, have invented a new and useful Improvement in Drip-Cups for Food Cutters; and I do hereby declare the following, when taken in connection with the accompanying drawings and the characters of reference marked thereon, to be a full, clear, and exact description of the same, and which said drawings constitute part of this application, and represent, in—

Fig. 1, a side view of a drip-cup for food-cutters constructed in accordance with my invention, and shown in connection with a food-cutter.

Fig. 2, a top view of the same.

Fig. 3, a front view, partly in section.

This invention relates to improvement in drip-cups for food cutters. In using food cutters, particularly for crushing fruit and juicy vegetables, the juice is liable to escape through the handle end of the casing and drip upon the floor. Various attempts have been made to take care of this drip but usually by some construction of the casing. The object of this invention is to provide a drip-cup which may be attached when required and removed when unnecessary, and the invention consists in the construction as hereinafter described, and particularly recited in the claims. In carrying out my invention I employ a cup 5 funnel-like in construction and preferably formed with one flat side. The lower end is provided with a threaded nipple 6 to receive a screw-threaded cap 7 by which the lower end of the cup may be closed. Secured to one side of the cup, and preferably the flat side 8 and projecting above the upper edge of the cup, is an arm 9 provided with a finger 10. This finger is adapted to be inserted between the head 11 of the clamping-screw 12 and the lower face of a table or other support 13, to which the food cutter 15, of any construction, is attached. This drip-cup is rigidly mounted in position and extends beyond the edge of the table, so that any juice escaping through the handle end of the food cutter will drop into the cup, from which it may be withdrawn by removing the cap 7.

I thus provide, in a very simple manner a drip-cup adapted to be used with any form of food cutter.

I claim:

1. A drip-cup for food cutters comprising a cup, a cap closing the lower end thereof, said cup provided with an upwardly projecting arm and a finger.

2. A drip-cup for food cutters comprising a funnel-like cup provided at its lower end with a threaded nipple, a cap adapted to be connected with said nipple, said cup provided with an upwardly projecting arm and a finger at the upper end thereof.

3. A drip-cup for food cutters comprising a funnel-like cup having one flat side, a cap adapted to close the lower end of the cup, and the cup provided with an upwardly projecting arm having a finger at its upper end.

In testimony whereof, I have signed this specification in the presence of two subscribing witnesses.

HELMA T. WALDNER.

Witnesses:
LEONARD O. RYAN,
CHARLES J. BRIGHT.